United States Patent
Chang et al.

[19]

[11] Patent Number: 6,145,939

[45] Date of Patent: Nov. 14, 2000

[54] ELECTRO-HYDRAULIC BRAKING SYSTEM HAVING COLD TEMPERATURE DETECTION AND COMPENSATION

[75] Inventors: Hsiao Hsiou (Eileen) Chang, Dayton; Scott Alan Stacey, Centerville; Deron Craig Littlejohn, Dayton, all of Ohio

[73] Assignee: General Motors Corporation, Detroit, Mich.

[21] Appl. No.: 09/177,025

[22] Filed: Oct. 22, 1998

[51] Int. Cl.[7] .................................................. B60T 13/74
[52] U.S. Cl. ......................................... 303/DIG. 2; 303/3
[58] Field of Search ...................... 303/DIG. 1, DIG. 2, 303/191, 3, 15

[56] References Cited

U.S. PATENT DOCUMENTS

| | | | |
|---|---|---|---|
| 3,253,409 | 5/1966 | Kellogg et al. | 60/329 |
| 5,971,499 | 10/1999 | Pape et al. | 303/9.61 |
| 5,971,503 | 10/1999 | Joyce et al. | 303/191 |
| 6,012,783 | 1/2000 | Schwarzer et al. | 303/140 |

*Primary Examiner*—Michael Mar
*Assistant Examiner*—Xuan Lan Nguyen
*Attorney, Agent, or Firm*—Robert M. Sigler

[57] ABSTRACT

An improved cold temperature compensation control method for an EH braking system in which cold temperature operation is detected without requiring a temperature sensor. An electronic controller monitors the pressure developed by one or more electrically operated boost units for a characteristic pressure profile that occurs in cold temperature operation of the braking system, and adjusts the control strategy when the characteristic pressure profile is detected. The characteristic pressure profile is deemed by its frequency and amplitude parameters; specifically, a frequency above a threshold frequency, and an amplitude above a threshold amplitude. In a first mechanization, the controller responds to a detected cold temperature operation by reducing the gain of a closed-loop pressure control, while in a second mechanization, the controller responds by switching from the closed-loop pressure control to a closed-loop position control.

5 Claims, 3 Drawing Sheets

ELECTRO-HYDRAULIC BRAKING SYSTEM HAVING COLD TEMPERATURE DETECTION AND COMPENSATION

This invention relates to electro-hydraulic (EH) braking systems in which hydraulic brake pressures are developed by multiple electro-hydraulic modules instead of a vacuum booster, and more particularly to a brake control that is compensated for cold temperature operation, where cold temperature operation is detected without the use of a temperature sensor.

BACKGROUND OF THE INVENTION

In conventional automotive braking systems, a master cylinder converts driver exerted brake pedal force into a corresponding hydraulic pressure, which is proportioned among the front and rear brakes. In power assisted braking systems, a vacuum booster is interposed between the pedal and the master cylinder to amplify the force applied to the master cylinder by using engine vacuum to create a pressure differential across one or more diaphragms coupled to the master cylinder.

As an alternative to the above-described conventional braking system, it has been proposed to use electrically powered boost units to develop the amplified brake pressures. Such systems—referred to herein as electro-hydraulic, or EH, systems—can advantageously be used, for example, in electric vehicles where there is no convenient vacuum source. Even in vehicles powered by an internal combustion engine, EH braking systems can be used to advantage for integrating advanced braking controls such as anti-lock braking and traction control.

One example of an EH braking system is disclosed in the U.S. Pat. No. 5,362,135 to Riddiford et al., issued Nov. 8, 1994, assigned to the assignee of the present invention, and incorporated herein by reference. In that system, the master cylinder pressure is coupled through normally open solenoid operated fluid valves and electrically powered boost units to the front service brakes of an electric vehicle. The master cylinder brake pressure developed in response to driver exerted brake pedal force is measured and used to develop a brake pressure command for the electrically powered boost units. The pressures actually developed by the boost units are measured to provide feedback to the controller, and the controller activates the boost units as required to bring the feedback signals into agreement with the pressure commands.

One aspect of the above-described EH braking control is that the control gains for the boost units are preferably temperature dependent to a certain degree. In particular, at cold ambient temperatures the hydraulic fluid has increased viscosity. While a temperature sensor may be used for gain scheduling, such sensors are sometimes not available in lower cost systems. Accordingly, what is desirable is a cold temperature compensation control which does not require the use of a temperature sensor.

SUMMARY OF THE PRESENT INVENTION

The present invention is directed to an improved cold temperature compensation control method for an EH braking system in which cold temperature operation is detected without requiring a temperature sensor. According to the invention, the controller monitors the pressure developed by one or more electrically operated boost units for a characteristic pressure profile that occurs in cold temperature operation of the braking system, and adjusts the control strategy when the characteristic pressure profile is detected. The characteristic pressure profile is defined by its frequency and amplitude parameters; specifically, a frequency above a threshold frequency, and an amplitude above a threshold amplitude. In a first mechanization, the controller responds to a detected cold temperature braking operation by reducing the gain of a closed-loop pressure control, while in a second mechanization, the controller responds by switching from the closed-loop pressure control to a closed-loop position control.

DETAILED DESCRIPTION OF THE DRAWINGS

Figure 1:
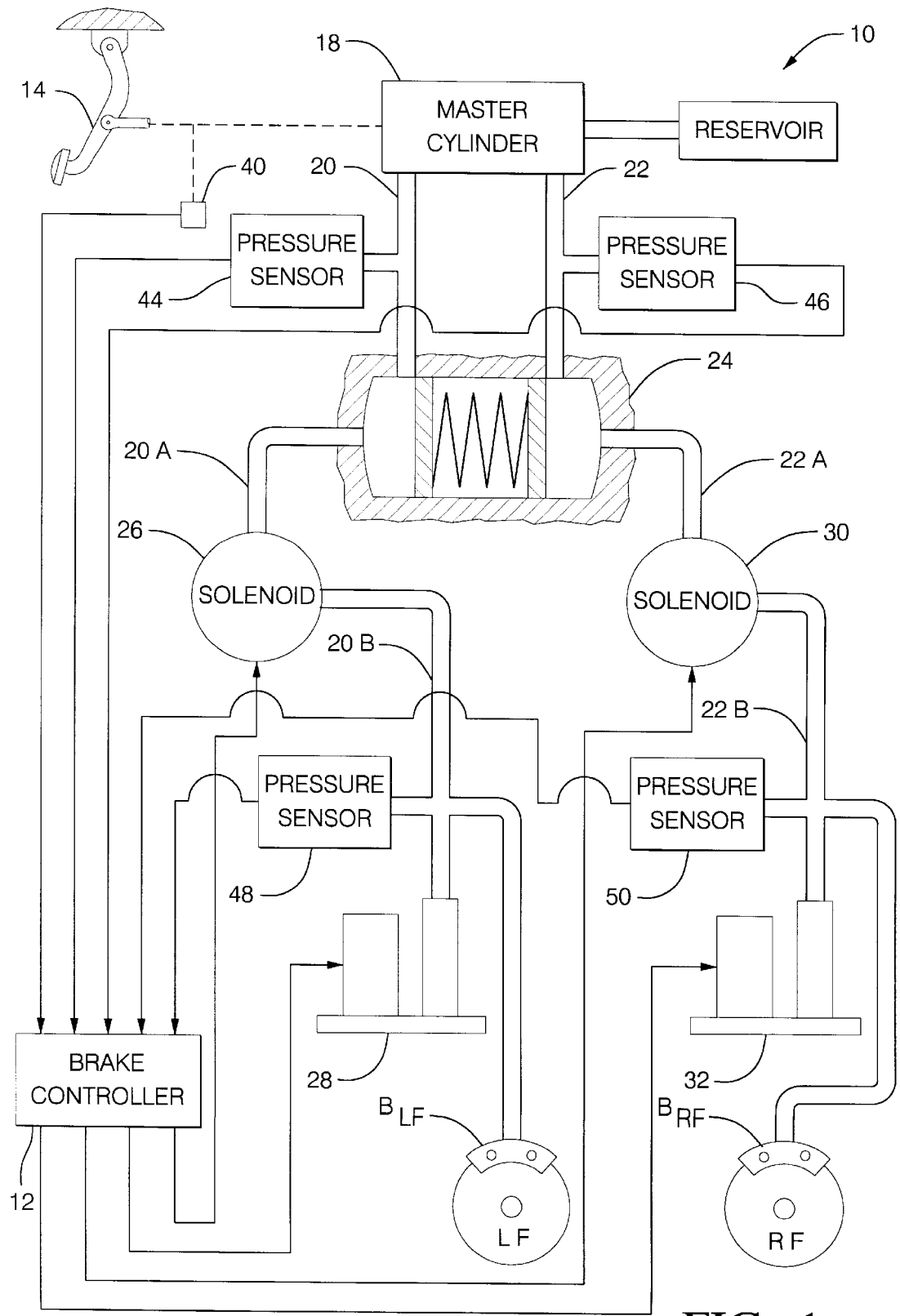
FIG. 1 is a schematic diagram of an EH braking system and electronic controller according to this invention.

Referring to FIG. 1, the reference numeral 10 generally designates an electro-hydraulic (EH) braking system for individually developing hydraulic braking pressure for the service brakes $B_{LF}$ and $B_{RF}$ of the left-front (LF) and right-front (RF) vehicle wheels under the control of an electronic Brake Controller 12. A driver-manipulated brake pedal 14 is mechanically coupled to Master Cylinder 18, which develops hydraulic pressure in proportion to the driver exerted braking force applied to pedal 14. Master Cylinder 18 outputs the developed pressure for the left front brake $B_{LF}$ on fluid supply line 20, and for the right front brake $B_{RF}$ on fluid supply line 22. Supply line 20 is coupled to the left-front brake $B_{LF}$ via accumulator 24, lines 20a, 20b, isolation valve 26 and motor-operated boost unit 28. In a similar manner, supply line 22 is coupled to the right-front service brake $B_{RF}$ via accumulator 24, line 22a, 22b, isolation valve 30 and motor-operated boost unit 32. The isolation valves 26, 30 are normally-open solenoid fluid valves operated by brake controller 12, and can be closed to isolate the master cylinder pressure from the respective brakes $B_{LF}$, $B_{RF}$. The motor-operated boost units 28, 32 are supplied with hydraulic fluid from master cylinder 18 when braking is not required, and operate under the control of brake controller 12 to develop and supply a desired brake pressure to the respective brakes $B_{LF}$, $B_{RF}$. In the event of an electrical failure, the isolation valves 26, 30 return to their normally open state, re-coupling the master cylinder supply lines 20 and 22 to the service brakes, allowing continued braking with the manually developed master cylinder pressure. Representative isolation valves and motor-operated boost units are shown and described in detail in the U.S. Pat. No. 5,246,283 to Shaw et al., issued Sep. 21, 1993, assigned to the assignee of the present invention, and incorporated herein by reference.

In carrying out the control of isolation valves 26, 30 and boost units 28, 32, brake controller 12 receives inputs from a number of braking system sensors, including brake pedal depression switch 40, left and right master cylinder pressure sensors 44 and 46 coupled to supply lines 20 and 22, respectively, and left and right brake pressure sensors 48, 50 coupled to supply lines 20b, 22b. Optionally, position sensors may be installed in the boost units 28, 32 to provide feedback to controller 12 regarding the position of a piston (not shown) used to control the brake pressures.

In general, the brake controller 12 generates a brake pressure command for each of the front wheels LF, RF based on the sensed movement of brake pedal 14 and the pressure developed in supply lines 20 and 22 by master cylinder 18. Other factors such as anti-lock braking, traction control, and vehicle handling may also influence the brake pressure commands. The brake controller 12 compares the pressure commands to the feedback pressure signals developed by respective pressure sensors 48, 50 to develop pressure error signals, and supplies current to the respective boost units 28, 32 based on the error signals and predefined gain parameters. An example of such a control is shown and described in the aforementioned U.S. Pat. No. 5,362,135 to Riddiford et al.

According to this invention, the brake controller 12 monitors the pressure feedback signals developed by sensors 48 and 50 for a characteristic pressure profile that occurs in cold temperature operation of the braking system, and adjusts the control strategy when the characteristic pressure profile is detected. The characteristic pressure profile is defined by its frequency and amplitude parameters; specifically, a frequency above a threshold frequency, and an amplitude above a threshold amplitude. If the characteristics pressure profile is detected, a Cold Temp Flag is set, and the controller 12 responds by adopting a modified control strategy that provides desired braking operation at cold temperatures.

Figure 2:
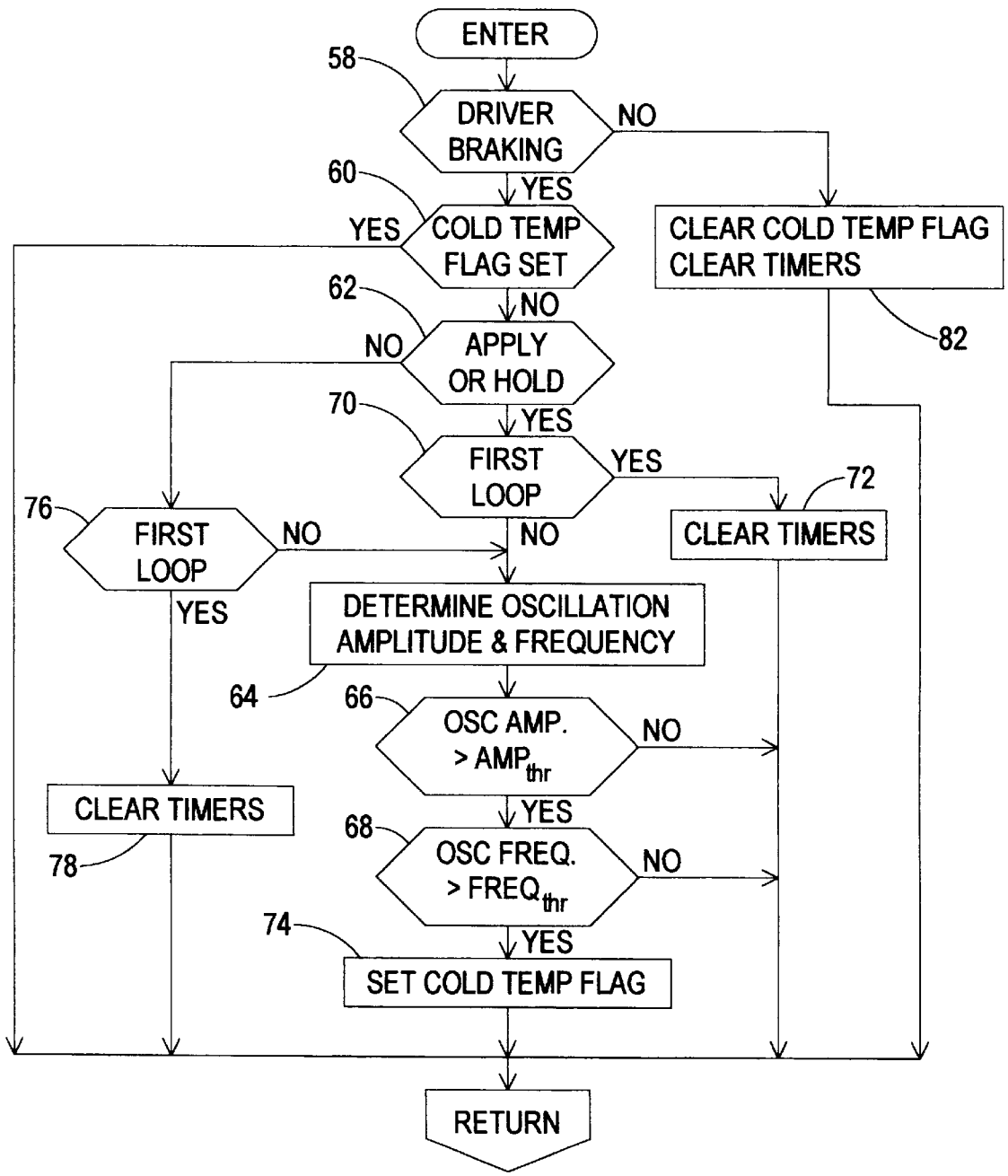
FIG. 2 is a flow diagram representative of computer program instructions executed by the controller of FIG. 1 in carrying out the cold temperature detection method of this invention.
Figure 3A:
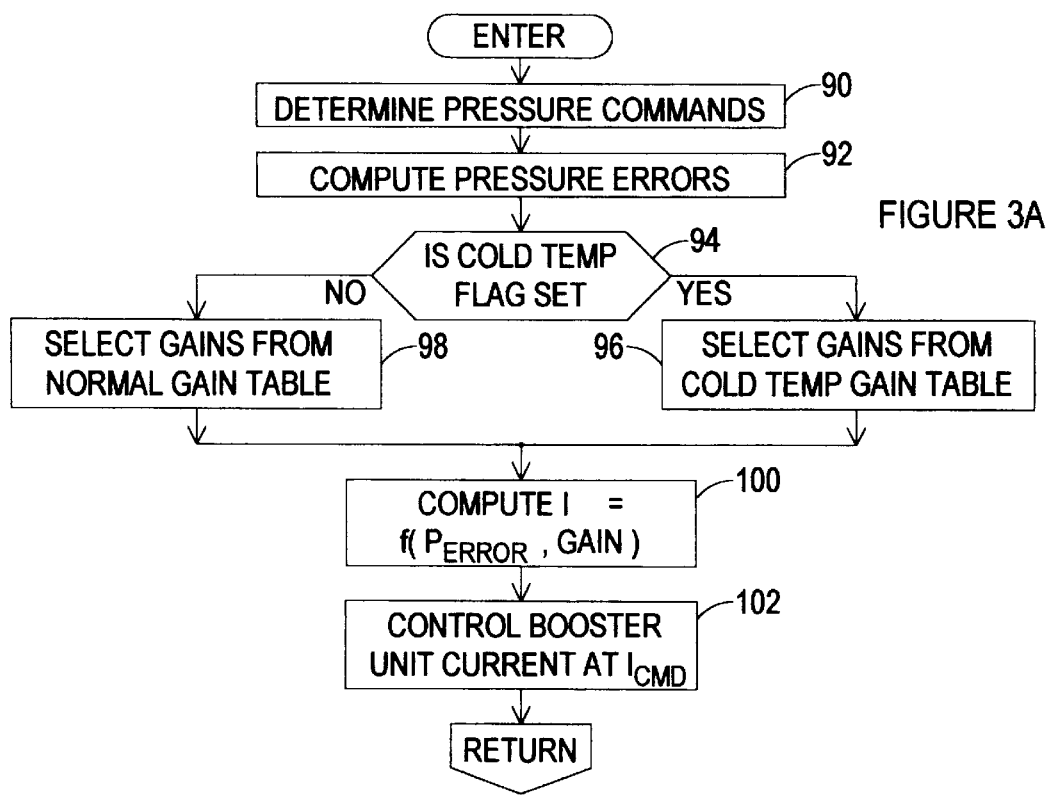
FIGS. 3A and 3B are flow diagrams depicting first and second alternate control strategies for the controller of FIG. 1, based on the result of the cold temperature detection flow diagram of FIG. 2.
Figure 3B:
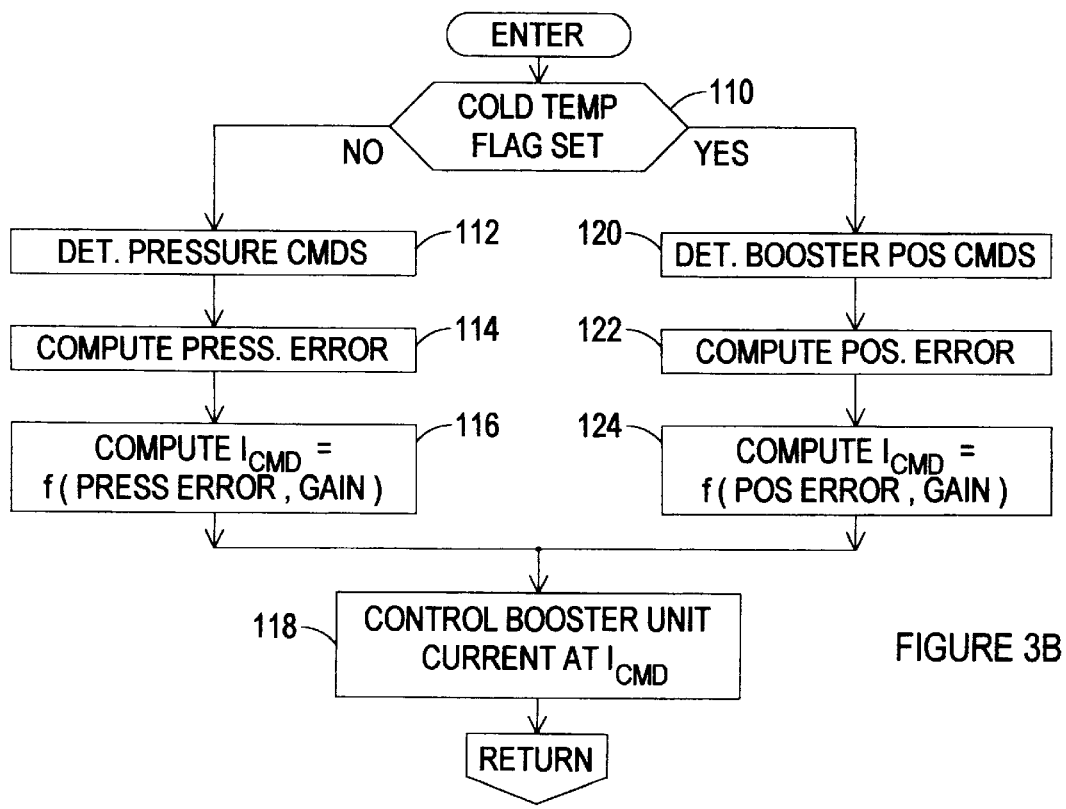

The above-described control is illustrated in the flow diagrams of FIGS. 2 and 3A–3B, which are executed by brake controller 12 as part of the overall control algorithm. Referring to FIG. 2, block 58 is first executed to determine if there is driver braking, as determined, for example, by the brake switch 40. If the Cold Temp Flag is not already set, and the driver is applying or holding the brake (that is, increasing or maintaining steady brake pedal pressure) as determined at blocks 60 and 62, the blocks 64–68 are executed to monitor the measured brake pressures for a characteristic pressure profile associated with cold temperature operation. Each time the "apply or hold" condition is first detected in a braking event, however, blocks 70–72 serve to clear or re-initialize the timers used to monitor frequency so that pressure pulses due to driver pedal movement are not interpreted as a high frequency oscillation. At block 64, the controller 12 determines the peak-to-peak amplitude and frequency of oscillation in each of the brake pressure feedback signals over a predefined interval such as 50 msec., using the timers referred to above. If the determined amplitude exceeds a predefined amplitude threshold AMPthr, and the determined frequency of oscillation exceeds a predefined frequency threshold FREQthr, as determined at blocks 66 and 68, the block 74 is executed to set the Cold Temperature Flag. As soon as the driver begins releasing the brake pedal, as determined at block 76, the block 78 clears or re-initializes the timers used to monitor frequency (similar to block 72, discussed above), but monitoring continues during the release, and the Cold Temperature Flag is not reset until the brake pedal 14 is released, as indicated at blocks 58 and 82.

The flow diagrams of FIGS. 3A and 3B depict a portion of the control routine regarding the development of a current command for the booster units 28, 32, in accordance with two alternate mechanizations. In the mechanization of FIG. 3A, the controller 12 uses a normal gain table when the Cold Temp Flag is cleared, and a cold temperature gain table when the Cold Temp Flag is set. In the mechanization of FIG. 3B, the controller 12 uses closed-loop pressure control when the Cold Temp Flag is cleared, and closed-loop position control when the Cold Temp Flag is set.

Referring to FIG. 3A, the blocks 90 and 92 are first executed to determine pressure commands for the booster units 28, 32, and to compute pressure error signals based on the difference between the commands and the respective pressure feedback signals from pressure sensors 48, 50. If the Cold Temp Flag is set, as determined at block 94, then block 96 is executed to look up closed-loop gain terms from a cold temperature gain table; otherwise, block 98 obtains the gain terms from the normal gain table. As indicated above, the cold temperature gain terms are lower than the normal gain terms so that desired cold temperature operation can be achieved. For example, the gain terms may include proportional, integral and derivative components, one or more of which are reduced by one-half when the Cold Temp Flag is set. Once the gain terms are determined, the blocks 100–102 are executed to compute the booster unit current commands and to carry out the current control.

Referring to FIG. 3B, the block 110 is first executed to determine if the Cold Temp Flag is set. If not, the blocks 112–118 are executed to carry out a closed-loop pressure control with normal gain terms, substantially as described above in reference to blocks 90–92 and 98–102 of FIG. 3A. However, if the Cold Temp Flag is set, the blocks 120–124 are executed to determine the booster unit current commands in accordance with a closed-loop position control. The block 120 determines the booster unit position commands, based on the master cylinder pressures detected by sensors 44, 46; these correspond to desired positions of a piston (not shown) in each booster unit 28, 32, as discussed above in respect to FIG. 1. Block 122 computes the position error between the desired and measured positions, and block 124 computes the current commands based on the error signals and suitable gain terms.

In summary, the control of this invention contributes to a low-cost EH braking system by eliminating the need for a temperature sensor. Cold temperature braking operation is detected by monitoring the brake pressure feedback for a characteristic oscillation associated with increased viscosity of the brake fluid, and the controller 12 carries out an alternate control that provides a desired cold temperature operation when the cold temperature condition is detected. In the embodiment of FIG. 3A, the gain of the closed-loop pressure control is reduced to achieve the desired control, whereas in the embodiment of FIG. 3B, the controller switches over to a closed-loop position control of the booster units to avoid the oscillations.

While this invention has been described in reference to the illustrated embodiment, it will be understood that various modifications and design variations will occur to those skilled in the art. For example, the control of this invention could equally be applied to braking systems where the boost pressure is developed by a solenoid or motor based mechanism. Additionally, the invention could obviously be applied to a four-channel system in which brake pressure at each of the four vehicle wheels is controlled. Accordingly, the scope of this invention is not limited to the illustrated embodiments, but rather, is defined by the appended claims.

The embodiments of the invention in which an exclusive property or privilege in claimed are defined as follows:

1. A control method for an electro-hydraulic braking system having an electrically operated boost unit selectively activated to supply hydraulic pressure to a service brake of a vehicle in relation to a detected driver braking force, the method comprising the steps of:

measuring the hydraulic pressure supplied to the service brake;

monitoring the measured pressure by detecting a pressure oscillation characteristic of cold temperature operation of said braking system;

operating the braking system under a first control strategy when the characteristic pressure oscillation is indicative of the hydraulic fluid having a temperature above a pre-defined amount; and responding to the detection of said characteristic pressure oscillation when the detected characteristic pressure oscillation is indicative of the hydraulic fluid having a temperature below said pre-defined amount by switching to a second control strategy that provides desired cold temperature operation of said braking system.

2. The control method of claim 1, wherein the boost unit is activated by a closed-loop control signal formed by applying a pre-defined gain parameter to a difference between the measured pressure and a pressure command determined in relation to the detected driver braking force, and wherein the step of responding to the detection of said characteristic pressure oscillation includes reducing said pre-defined gain parameter.

3. The control method of claim 1, including the steps of:

forming an activation signal for said boost unit with a closed-loop pressure control according to a difference between the measured pressure and a pressure command determined in relation to the detected driver braking force; and in response to the detection of said characteristic pressure oscillation, forming the activation signal for said boost unit with a closed-loop position control according to a difference between a measured position of said boost unit and a position command determined in relation to the detected driver braking force.

4. The control method of claim 1, wherein the step of monitoring the measured pressure to detect a pressure oscillation characteristic of cold temperature operation of said braking system includes the steps of:

measuring an amplitude and a frequency of said pressure oscillation; and detecting the characteristic oscillation when the measured amplitude exceeds a pre-defined amplitude threshold and the measured frequency exceeds a pre-defined frequency threshold.

5. The control method of claim 4, including the step of:

re-initializing the measuring of the frequency of said pressure oscillation in response to a detected change in direction of said driver braking force.

* * * * *